(12) United States Patent
Saint-Jalmes et al.

(10) Patent No.: US 8,546,474 B2
(45) Date of Patent: Oct. 1, 2013

(54) THERMALLY-STABLE CROSSLINKED SILICONE ELASTOMERS

(75) Inventors: Laurent Saint-Jalmes, Vourles (FR); Sébastien Sterin, St-cyr au Mont d'or (FR); Christian Prud'Homme, Lyons (FR); Catherine George, Saint Genis-les-ollieres (FR)

(73) Assignee: Bluestar Silicones France SAS, Lyons (FR)

( * ) Notice: Subject to any disclaimer, the term of this patent is extended or adjusted under 35 U.S.C. 154(b) by 620 days.

(21) Appl. No.: 12/446,194

(22) PCT Filed: Oct. 23, 2007

(86) PCT No.: PCT/EP2007/061328
§ 371 (c)(1),
(2), (4) Date: Nov. 5, 2010

(87) PCT Pub. No.: WO2008/049828
PCT Pub. Date: May 2, 2008

(65) Prior Publication Data
US 2011/0040064 A1    Feb. 17, 2011

(30) Foreign Application Priority Data

Oct. 24, 2006    (FR) ...................................... 06 09307

(51) Int. Cl.
*C08K 5/07*    (2006.01)

(52) U.S. Cl.
USPC .......................................... 524/357; 524/356

(58) Field of Classification Search
USPC .................................................. 524/356, 357
See application file for complete search history.

(56) References Cited

U.S. PATENT DOCUMENTS

| 4,189,306 A | 2/1980 | Sandy |
| 4,404,348 A * | 9/1983 | Fau et al. ........................ 528/15 |
| 4,528,313 A | 7/1985 | Swihart et al. |

FOREIGN PATENT DOCUMENTS

| EP | 0866099 | 9/1998 |
| FR | 2511384 | 2/1983 |

* cited by examiner

*Primary Examiner* — Edward Cain
(74) *Attorney, Agent, or Firm* — Dentons US LLP

(57) ABSTRACT

Thermally-stable silicone elastomers are prepared from organopolysiloxane compositions by polyaddition, polycondensation or vulcanization reactions in the presence of peroxide; the thermal stability of the silicone elastomers is achieved by the inclusion of an additive derived from an iron (III) complex.

15 Claims, No Drawings

THERMALLY-STABLE CROSSLINKED SILICONE ELASTOMERS

CROSS-REFERENCE TO EARLIER APPLICATIONS

This application is a national phase of PCT/EP 2007/061328, filed Oct. 23, 2007 and designating the United States (published in the French language on May 2, 2008, as WO 2008/049828 A1; the title and abstract were also published in English), which claims foreign priority under 35 U.S.C. §119 of FR 0609307, filed Oct. 24, 2006, each hereby expressly incorporated by reference in its entirety and each assigned to the assignee hereof.

The present invention relates to thermally stable silicone elastomers and also to the organopolysiloxane compositions for producing same by polyaddition, polycondensation or vulcanization reactions in the presence of peroxide. The invention is most particularly suitable for organopolysiloxane compositions of the heat-curable type (HCE) in the presence of peroxide. These elastomers are in particular of use in molded and/or extruded items requiring thermal stability up to 250° C. As examples of use, mention may be made of heat seals, such as oven seals, or sheathing for electrical wires and cables.

Elastomer-forming organopolysiloxane compositions are well-known commercially available materials. Compared with organic elastomers, organopolysiloxanes or silicones have better thermal resistance properties. However, above 200° C., and more particularly over temperature ranges of between 220 and 250° C., even organopolysiloxane elastomers can lose their elastomeric properties and become hard and brittle after a certain exposure time.

For a long time, attempts have been made to improve the thermal stability of silicones by adding several types of compounds to the matrix.

British patent GB-A-1 251 305 thus proposes incorporating at least 3% by weight of fumed titanium dioxide into the basic elastomeric composition and reports an improvement in the behavior (compression set) of the elastomer cured at temperatures of 232 and 315° C. maintained for 16 and 24 hours, respectively.

For example, French patent FR-A-2 308 664 proposes improving the thermal stability of elastomeric compositions based on cured siloxanes by incorporating titanium dioxide (in particular with a particle size of between 15 and 40 nanometers) and cerium oxide and/or cerium hydroxide. These two additives together would be more effective than titanium dioxide alone and would make it possible to improve the resistance of the cured elastomer between 220 and 270° C.

European patent application EP-A-0 595 078 proposes, as thermal stabilizer, a titanium dioxide-based mixed oxide containing from 1% to 30% by weight of aluminum oxide or of silicon oxide, the mixed oxide having a BET specific surface area of between 10 and 150 m$^2$/g. The heat-stability of the specific surface area of the oxides is greater than that of a simple titanium dioxide P25 (BET 50 m$^2$/g).

European patent application EP-A-745 644 describes organopolysiloxane compositions which, when crosslinking, result in transparent elastomers having a high thermal stability. To do this, the organopoly-siloxane composition comprises, dispersed throughout the composition, organophilic particles made from at least one metal oxide in the form of polycrystalline nanoparticles—preferably made from crystallites of 4 to 6 nm—of maximum size 50 nm and with a BET specific surface area of at least 250 m$^2$/g, preferably between 250 and 300 m$^2$/g, and having undergone a surface treatment to make them organophilic, comprising grafting organosilicon groups. Coloration of the organopolysiloxane composition is not envisioned.

Another solution has been recommended by American U.S. Pat. No. 2,445,567, which proposes, in order to avoid the problems of gelling of compositions based on polysiloxanes substituted with hydrolyzable groups, the use of a thermal stabilizer which is a metal salt of a carboxylic acid, the metal being chosen from iron, cobalt, nickel and copper. Among the iron metal salts, mention is made of:
- salts of saturated aliphatic fatty acids, for example iron acetate, iron propionate, iron butyrate, iron n-hexanoate and iron 2-ethylhexanoate,
- salts of aliphatic or aromatic polycarboxylic acids, such as iron oxalate, iron succinate, iron adipate, iron maleate, iron phthalate, etc.

However, most of these additives exhibit problems of solubility in the silicone compositions.

Although some of these proposed solutions have not insignificant advantages, the silicone industry is still in search of new additives in order to considerably stabilize silicone elastomers in the case of high temperatures, in particular greater than or equal to 250° C., maintained over substantial periods. There exists therefore the need to further improve the thermal stability of these elastomers in a manner which makes it possible to preserve their elastomeric properties, even in the case of repeated and/or sustained exposure to heat, and to find additives which do not exhibit problems of solubility in silicone compositions.

The objective of the present invention is therefore to provide organopolysiloxane compositions which, when crosslinked, result in thermally stable silicone elastomers having a high thermal stability.

Within the meaning of the invention, the term "thermally stable silicone elastomer" is intended to mean in particular a silicone elastomer which maintains elastomeric properties and becomes neither hard nor brittle when it is subjected to a temperature above 200° C., in particular between 200° C. and 275° C., maintained for several days, in particular 3 days. Entirely preferably, this involves elastomers which are thus resistant to a temperature above 230° C., in particular between 230° C. and 300° C., maintained for 3 days or more.

In fact, entirely remarkably, the inventors have, for example, obtained, in accordance with the invention, an elastomer which maintains acceptable elastomeric properties and which does not therefore become brittle after treatment for 7 days at 250° C. Hardness, impact strength, tensile strength, elongation at break and 100% modulus remained within entirely acceptable limits, i.e. within limits enabling the anticipated use of the elastomer.

The subject of the present invention is therefore an organopolysiloxane composition which crosslinks to give an elastomer, resulting, when it is crosslinked, in a thermally stable elastomer, comprising at least one thermal stabilizer (S) which is an iron(III) complex comprising at least one ligand L which is a β-diketonate (A) derived from a β-diketone of formula (I) below:

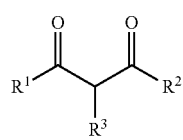

in which:

$R^1$ is a group represented by formula (II) below:

$$(Y)_n\text{-}\Phi\text{-} \qquad (II)$$

in which:
n is an integer from 0 to 5,
Φ is a phenyl, and
each group Y, which may be identical or different, is a hydrogen atom or a group chosen from the group constituted of a hydrocarbon-based chain containing from 1 to 40 carbon atoms, an alkoxy, a silylated group and a halogen atom;
the group $R^2$ represents a group having the same definition as $R^1$, identical or different than $R^1$, a hydrogen atom or a group chosen from the group constituted of a hydrocarbon-based radical containing from 1 to 40 carbon atoms, optionally interrupted with one or more oxygen atoms, an aralkyl radical, an alkoxy and a silylated group;
the group $R^3$ represents a hydrogen atom or a hydrocarbon-based group containing from 1 to 40 carbon atoms, optionally interrupted with one or more heteroatom(s), and
it being possible for $R^1$, $R^2$ and $R^3$ to be optionally connected together in pairs by a hydrocarbon-based chain optionally interrupted with one or more heteroatom(s), so as to form a ring.

According to one preferred embodiment, the thermal stabilizer (S) is an iron(III) complex having the formula:

$$Fe[L_x;B_y;C_z]$$

in which:
x, y and z represent the number of moles of each species with:
0<x≤3, 0≤y≤(3−x−z); 0≤z≤(3−x−y) and [x+y+z]=3,
the ligand L is a β-diketonate (A) as defined above, and
the ligands B and C, which may be identical or different, are chosen from the group constituted of: an ion constituted of a single atom and a molecular ion.

Preferably, the thermal stabilizer (S) is an iron(III) complex having the formula:

$$Fe[L_x;B_y;C_z]$$

in which:
x, y and z represent the number of moles of each species with:
0<x≤3; 0≤y≤(3−x−z); 0≤z≤(3−x−y) and [x+y+z]=3,
the ligand L is a β-diketonate (A) as defined above or as claimed in claim 1, and
the ligands B and C, which may be identical or different, are molecular ions.

According to one preferred embodiment, the ligands B and C, which may be identical or different, are carboxylates.
According to another preferred embodiment, the ligands B and C, which may be identical or different, have the formula:

$$R^4COO^-$$

in which $R^4$ is an optionally substituted, $C_1$-$C_{40}$ hydrocarbon-based monovalent organic radical.

It is particularly advantageous for the ligands B and C, which may be identical or different, to be chosen from the group constituted of an aromatic carboxylate and a $C_1$-$C_{40}$ saturated fatty acid carboxylate.

Among the $C_1$-$C_{40}$ saturated fatty acid carboxylates, mention may be made of the anions of the following corresponding acids:
formic acid, acetic acid, propionic acid, butyric acid, caproic acid, caprylic acid, capric acid, lauric acid, myristic acid, palmitic acid, margaric acid, stearic acid, arachidic acid, behenic acid, lignoceric acid, cerotic acid, montanic acid, melissic acid, laceroic acid and benzoic acid.

Other examples of β-diketonates are derivatives of the following β-diketones:
stearoylbenzoylmethane (or Rhodiastab®-50 sold by the company Rhodia, CAS 58446-52-9),
dibenzoylmethane (or Rhodiastab®-83 sold by the company Rhodia, CAS 120-46-7),
octanoylbenzoylmethane (or Rhodiastab®-92 sold by the company Rhodia, CAS 68892-13-7),
4-t-butyl-4'-methoxydibenzoylmethane (CAS 70356-09-1),
4,4'-dimethoxydibenzoylmethane, and
4,4'-di-tert-butyldibenzoylmethane.

One most particularly preferred embodiment is when the β-diketonate (A) is derived from a stearoylbenzoylmethane β-diketone of formula (II) below

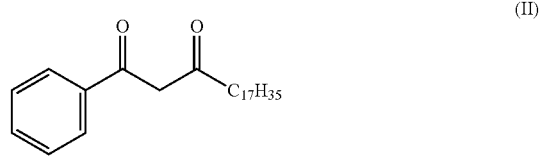

(II)

The thermal stabilizer is present in varying amounts depending on the nature of the latter. By way of example, an amount ranging from 0.001 to 3 parts by weight per 100 parts of the silicone composition, and preferably from 0.01 to 1 part by weight per 100 parts of the silicone composition, may be added. It may be added pure, in solution in an organic solvent, in a silicone oil, in a silicone gum or even in a master mixture, i.e. a silicone composition comprising a silicone gum and a filler according to the type of application.

Silicone Compositions

The curable polyorganosiloxane compositions targeted in the context of the present invention, provided in a single or several packaging(s) (single-component or multicomponent), contain, in addition to the thermal stabilizer (S), a main constituent formed from one or more polyorganosiloxane constituent(s), an appropriate catalyst and, optionally, one or more compound(s) taken from the group made up of, in particular: reinforcing fillers, cross-linking agents, anti-structuring agents, adhesion agents, and catalyst-inhibiting agents.

The thermal stabilizer (S) is useful for any polyorganosiloxane composition intended for obtaining a silicone elastomer, either crosslinking at a high temperature by the action of organic peroxides (HCE) or crosslinking in the presence of a metal catalyst at ambient temperature or with the heat from polyaddition reactions (HCE, LSR or polyaddition RTV) or from polycondensation reactions (polycondensation RTV).

The expressions RTV, LSR and HCE are well known to those skilled in the art: RTV is the abbreviation for "Room Temperature Vulcanizing"; "LSR is the abbreviation for "Liquid Silicone Rubber"; HCR is the abbreviation for "Heat Cured Rubber" and HCE is the abbreviation for "Heat Curable Elastomer".

The invention applies most particularly to the heat-curable elastomeric organopolysiloxane compositions which comprise:
100 parts of at least one diorganopolysiloxane gum A having a viscosity of greater than 1 000 000 mPa·s at 25° C., from 5 to 150 parts of a reinforcing filler B,
from 0.1 to 7 parts of an organic peroxide C, and
optionally, at least one "antistructuring" compound F.

Such HCEs (heat-curable elastomers), called peroxide-cured HCEs, are for example described in U.S. Pat. Nos. 3,142,655, 3,821,140, 3,836,489 and 3,839,266.

The gums A are well-known products sold by silicone manufacturers and they can be manufactured by carrying out processes according to techniques already known.

The diorganopolysiloxane gums A of viscosity greater than 1 000 000 mPa·s at 25° C., preferably greater than 2 000 000 mPa·s at 25° C., are high-molecular-weight linear polymers, the diorganopolysiloxane chain of which is constituted essentially of units of formula $R_2SiO_{2/2}$, this chain being blocked at each end by units of formula $R_3SiO_{1/2}$ and/or the radical of formula OR'. R and R' are organic radicals, in particular alkyl. The presence, along the diorganopolysiloxane chain, of small amounts of units other than $R_2SiO_{2/2}$, for example of formula $RSiO_{3/2}$ and/or $SiO_{4/2}$, is not, however, excluded in the proportion of at most 2% relative to the number of $R_2SiO_{2/2}$ units. Although the meaning of the radicals R and R' is explained below in greater detail, it should be specified that the term "alkyl radical" is intended to mean $C_1$-$C_4$ alkyl radicals, and more especially methyl, ethyl, n-propyl and n-butyl radicals.

By way of concrete examples of units of formulae $R_2SiO_{2/2}$ and $R_3SiO_{1/2}$ and of radicals of formula OR', mention may be made of those of formulae:

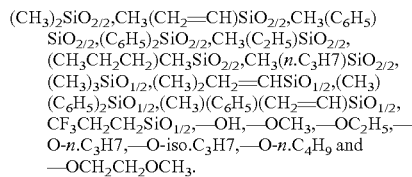

The preferred gums A are the gums formed from a series of siloxy units of formula $R_2SiO_{2/2}$, blocked at each end of their chains by a siloxy unit of formula $R_3SiO_{1/2}$ and/or a radical of formula OR'; in these formulae, the symbols R, which may be identical or different, represent methyl, ethyl, n-propyl, phenyl, vinyl and 3,3,3-trifluoropropyl radicals, at least 60% by number of these radicals being methyl radicals and at most 3 mol % of the siloxy units being organovinylsiloxy units, and the symbol R' represents a hydrogen atom, an alkyl radical containing from 1 to 4 carbon atoms, or the beta-methoxy-ethyl radical.

In the context of the present invention, the use of vinylated dimethylpolysiloxane gums, i.e. which comprise vinyl radicals linked to the silicon atoms in the chain and/or at the ends of the chain at a molar content of vinylmethylsiloxy units of at most 1%, is most particularly preferred.

The fillers B, preferably the reinforcing silicas B, are used in a proportion of from 5 to 150 parts, preferably from 8 to 100 parts, per 100 parts of diorganopolysiloxane gums A. They are chosen from fumed silicas and precipitated silicas. They have a specific surface area, measured according to the BET and CTAB methods, of at least 50 $m^2/g$, preferably greater than 70 $m^2/g$, an average primary particle size of less than 80 nanometers and an apparent density of less than 200 g/liter.

These silicas can be incorporated as they are, or after having been treated with organosilicon compounds normally used for this purpose. Among these compounds are methylpolysiloxanes such as hexamethyldisiloxane or octamethylcyclotetrasiloxane, methylpolysilazanes such as hexamethyldisilazane or hexamethylcyclotrisilazane, chlorosilanes such as dimethyldichlorosilane, trimethylchlorosilane, methylvinyldichlorosilane or dimethylvinylchlorosilane, and alkoxysilanes such as dimethyldimethoxysilane, dimethylvinylethoxysilane or trimethylmethoxysilane. During this treatment, the silicas may increase their starting weight by up to 20%, preferably approximately 18%.

In addition to the reinforcing silicas B, semi-reinforcing or bulking mineral fillers B may be introduced. These fillers B are more coarse and have an average particulate diameter of greater than 0.1 μm. These fillers B are more especially represented by ground quartz, calcined clays, diatomaceous silicas, calcium carbonate, iron oxide, titanium oxide, magnesium oxide, aluminum oxide, zinc sulfate and barium sulfate. They are introduced in a proportion of from 5 to 120 parts, preferably from 10 to 50 parts, per 100 parts of gum A. These mineral fillers may be used as they are, i.e. untreated, or treated with the organosilicon compounds mentioned above in the case of the reinforcing silicas B.

The organic peroxides C are used in a proportion of from 0.1 to 7 parts, preferably from 0.2 to 5 parts, per 100 parts of the gums A. They are well known to those skilled in the art and comprise more especially benzoyl peroxide, 2,4-dichlorobenzoyl peroxide, dicumyl peroxide, 2,5-bis(t-butylperoxy)-2,5-dimethylhexane, t-butyl perbenzoate, t-butyl peroxy isopropyl carbonate, di-t-butyl peroxide and 1,1-bis(t-butylperoxy)-3,3,5-trimethylcyclohexane. These materials may also be crosslinked with Pt (platinum-containing compounds) in the presence of an organopoly-siloxane bearing reactive functions of SiH type.

These various peroxides decompose at temperatures and at rates that are sometimes different. They are chosen according to the required curing conditions.

The compositions according to the invention may also comprise from 0.1 to 10 parts, preferably from 0.3 to 5 parts, of at least one diorganopolysiloxane oil F, having a viscosity of at most 5000 mPa·s at 25° C., formed from a series of units of formula $R''_2SiO_{2/2}$ and blocked at each end of its chain with a radical of formula OR'; in these formulae, the symbols R'', which may be identical or different, represent methyl, phenyl or vinyl radicals, at least 40% by number of these radicals being methyl, and the symbol R' has the meaning given under A.

The meaning of the symbols R'' and R' was explained above.

By way of concrete examples of units of formula $R''_2SiO_{2/2}$ and of radicals of formula OR', mention may be made of those of formulae:

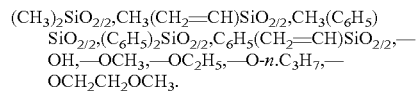

Preferably, use is made of:
dimethylpolysiloxane oils blocked at each end of their chain with hydroxyl, methoxy or beta-methoxy-ethoxy radicals, having a viscosity of 10 to 200 mPa·s at 25° C.;
methylphenylpolysiloxane oils constituted of $CH_3(C_6H_5)SiO_{2/2}$ units, blocked at each end of their chain with hydroxyl and/or methoxy radicals, having a viscosity of 40 to 2000 mPa·s at 25° C.

The objective of the use of the oils F is to prevent the compositions of the invention from undergoing a change during storage, and more specifically from becoming structured, from curing; they are therefore "antistructuring" agents.

"Antistructuring" agents may completely or partly replace the oils F; for example, diphenylsilanediol and the silanes of formulae:

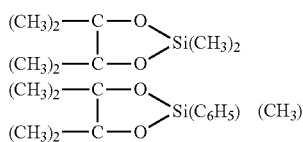

The preparation of the compositions in accordance with the invention is carried out using known mechanical means, for example kneaders, roll-type mixers, screw-type mixers or arm mixers. The various constituents are incorporated into these devices in what may be any order. It is, however, recommended to load first of all the gums A and the reinforcing silicas B and lastly the peroxides C.

The compositions are crosslinked by heating in the case of peroxide catalysis. The duration of the heating obviously varies with the temperature, the pressure and the nature of the crosslinking agents. It is generally of the order of several minutes at around 100-180° C.

The invention also applies, of course, to the heat- or cold-curable elastomeric compositions, which crosslink by polyaddition of polycondensation.

Two-component or single-component polyorganosiloxane compositions which crosslink at ambient temperature or with the heat from polyaddition reactions, essentially by reaction of hydrogenosilylated groups with alkenyl-silylated groups, in the presence of a metal catalyst, generally platinum-based, are described, for example, in U.S. Pat. Nos. 3,220,972, 3,284,406, 3,436,366, 3,697,473 and 4,340,709. In the case of hot-crosslinking compositions which crosslink by means of polyaddition reactions, called polyaddition HCEs, the polyorganosiloxane constituent(s) bearing alkenyl-silylated groups has (have) a viscosity at 25° C. of greater than 500 000 mPa·s, and preferably between 1 million mPa·s and 30 million mPa·s, and even more. The polyorganosiloxane constituent(s) bearing hydrogenosilylated groups generally has (have) a viscosity at 25° C. at most equal to 10 000 mPa·s, and preferably between 5 and 1000 mPa·s.

Examples of polyorganosiloxane compositions are the single-component or two-component polyorganosiloxane compositions which crosslink with the heat from polyaddition reactions, called polyaddition HCE compositions, which comprise:

(a') 100 parts by weight of a polydiorganosiloxane gum which is a linear homopolyer or copolymer having, on average per molecule, at least 2 vinyl groups linked to different silicon atoms, located in the chain and/or at the ends of the chain, for which the other organic radicals linked to the silicon atoms are chosen from methyl, ethyl and phenyl radicals, at least 60 mol % of these other radicals (and preferably all of these other radicals) being methyl radicals, and said gum having a viscosity of greater than 500 000 mPa·s at 25° C., and preferably of at least 1 million mPa·s;

(b') at least one polyorganohydrogenosiloxane chosen from linear, cyclic or network homopolymers and copolymers having, on average per molecule, at least 2, preferably at least 3 hydrogen atoms linked to different silicon atoms, and of which the organic radicals linked to the silicon atoms are chosen from methyl, ethyl and phenyl radicals, at least 60 mol % of these radicals (and preferably all of these radicals) being methyl radicals, and having a viscosity ranging from 5 to 1000 mPa·s at 25° C., the reactant (b') being used in an amount such that the molar ratio of the hydride functions of (b') to the vinyl groups of (a') is between 0.4 and 10, and preferably between 1.1 and 5;

(c') a catalytically effective amount of a platinum catalyst;

(d') 0.5 to 150 part(s) by weight, preferably from 1 to 100 parts by weight, of siliceous filler(s) per 100 parts by weight of all the polyorganosiloxanes (a')+(b').

If it is necessary to delay the crosslinking, an inhibitor (f') of the platinum catalyst can be added to the polyorganosiloxane composition which crosslinks by polyaddition reactions. These inhibitors are known. Use may in particular be made of organic amines, silazanes, organic oximes, carboxylic diacid diesters, acetylenic ketones and especially, and these are the preferred inhibitors, acetylenic alcohols (cf., for example, FR-A-1 528 464, 2 372 874 and 2 704 553 and cyclic polydiorganosiloxanes constituted essentially of units (II) where Z=vinyl and where x=y=1, optionally associated with units (I) where n=2. When an inhibitor is used, it is used in a proportion of 0.005 to 5 parts by weight, preferably 0.01 to 3 parts by weight, per 100 parts of gum (a').

These acetylenic alcohols, which are among the preferred thermal hydrosilylation reaction blockers, have the formula:

$$R^1-(R^2)C(OH)-C\equiv CH$$

in which formula:

$R^1$ is a linear or branched alkyl radical, or a phenyl radical;
$R^2$ is H or a linear or branched alkyl radical, or a phenyl radical;

it being possible for the radicals $R^1$ and $R^2$ and the carbon atom located in the α-position with respect to the triple bond to optionally form a ring;
the total number of carbon atoms contained in $R^1$ and $R^2$ being at least 5, preferably from 9 to 20.

Said alcohols are preferably chosen from those having a boiling point above 250° C. By way of examples, mention may be made of:

1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

These α-acetylenic alcohols are commercially available products.

The preparation of the polyorganosiloxane compositions called polyaddition HCEs is carried out using known mechanical means, for example devices equipped with screw-type mixers, roll-type mixers or arm mixers. The various constituents are incorporated into these devices in what may be any order, or in an order which will take into account the single-component or two-component form desired for the compositions.

The polyorganosilxoane compositions also containing the thermal stabilizer (S) may be single-component compositions, i.e. provided in a single packaging; if the composition must be stored before use thereof, it may be desirable to add, in the case of the polyaddition HCE compositions, an effective amount of an inhibitor (to which reference was made above) of the catalytic action of platinum which disappears by heating during the crosslinking of the composition. These compositions also containing additive may also be two-component compositions, i.e. provided in two separate packagings, just one of which comprises the crosslinking catalyst; in order to obtain the elastomer, the content of the two packagings is mixed and the crosslinking takes place by virtue of the catalyst. Such single-component and two-component compositions are well known to those skilled in the art.

Examples of two-component or single-component organopolysiloxane compositions which crosslink at ambient temperature by polycondensation reactions through the action of moisture, generally in the presence of a metal catalyst, for example a tin or titanium compound, are described, for example, for single-component compositions in U.S. Pat. Nos. 3,065,194, 3,542,901, 3,779,986 and 4,417,042, and in patent FR-A-2 638 752, and for two-component compositions in U.S. Pat. Nos. 3,678,002, 3,888,815, 3,993,729 and 4,064,096.

The polycondensation composition may also comprise a silane bearing two hydrolyzable groups serving as an elongating silane. These difunctional silanes are entirely known to those skilled in the art.

The compositions according to the invention are stable with respect to storage. They are particularly suitable for molding and for extrusion-molding. They transform readily, which makes it possible to produce very varied shapes.

A subject of the present invention is also a thermally stable organopolysiloxane elastomer that can be obtained by curing and/or crosslinking a composition as defined above or as claimed in any one of claims 1 to 8.

Another subject of the invention comprises a novel thermal stabilizer (S) for an organopolysiloxane composition which crosslinks to give an elastomer which is an iron(III) complex having the formula:

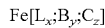

in which:
  x, y and z represent the number of moles of each species with:
    $0 \leq x \leq 3$, $0 \leq y \leq (3-x-z)$; $0 \leq z \leq (3-x-y)$ and $[x+y+z]=3$,
    the ligand L is a β-diketonate (A) as defined above or as claimed in claim 1, and
    the ligands B and C, which may be identical or different, are carboxylates.
  Preferably:
    $0 < x \leq 3$; $0 \leq y \leq (3-x-z)$; $0 \leq z \leq (3-x-y)$ and $[x+y+z]=3$, and
    the ligands B and C, which may be identical or different, are chosen from the group constituted of a $C_1$-$C_{40}$ saturated fatty acid carboxylate and an aromatic carboxylate.
  A particularly preferred thermal stabilizer is that for which, in formula (II):
    x=3, y=0 and z=0, and
    the ligand L is a β-diketonate derived from a stearoylbenzoylmethane β-diketone of formula (II) below:

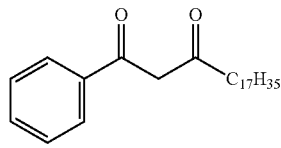

(II)

The β-diketones used to prepare the β-diketonates according to the invention are commercially available or can be prepared, for example, by means of a Claisen reaction as described in patent EP 1 129 073, or by reacting a carbanion of a ketone with an ester as described in patents EP-454 623 or U.S. Pat. No. 5,015,623.

The preparation of the thermal stabilizers (S) does not present any particular difficulty for those skilled in the art. For example, the molecules which will constitute the ligands A, B and C of the stabilizer (S) can be mixed with water, and then potassium hydroxide, an organic solvent (for example toluene) and a solution of iron chloride hexahydrate are added. After reaction, extraction and purification according to the usual chemistry techniques, a stabilizer (S) according to the invention is obtained. Those skilled in the art will vary the proportions of each of the constituents in order to obtain the desired complex.

Another subject of the present invention concerns the use of a thermal stabilizer (S) according to the invention and as defined above, for preparing a thermally stable elastomer from an organopolysiloxane composition which crosslinks to give an elastomer.

The final subject of the invention concerns a method for thermally stabilizing a silicone elastomer, characterized in that a thermal stabilizer (S) according to the invention and as defined above is added to an organopolysiloxane composition which crosslinks to give an elastomer.

The invention will now be described in greater detail using embodiments taken by way of nonlimiting examples.

EXAMPLES

Example 1

Synthesis of the Thermal Stabilizers (S) According to the Invention

Rhodiastab®-50=benzoylstearylmethane (hereinafter abbreviated to "R50")

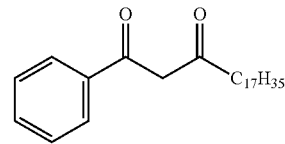

Ligand A=β-diketonate derived from R50.
a) Preparation of the Stabilizer (S1): Fe[Ligand A]$_3$ 19.5 g of "Rhodiastab® 50" (50 mmol), in a mixture of 76 g of methanol and 85 g of toluene, are loaded into a 100 ml reactor equipped with an anchor stirrer, a temperature probe and a condenser. The reaction medium is stirred at 60° C. and 6.5 g of aqueous potassium hydroxide solution at 49.8% by weight (i.e. 58 mmol of potassium hydroxide, 1.14 equivalent relative to the moles of beta-diketone) are added. 8.05 g of a solution of iron chloride hexahydrate at 54.95% by weight in water (i.e. 163 mmol of iron) are then added. After a reaction time of 15 minutes, the phases are separated and the organic phase is washed with deionized water. The solvents are then removed by distillation under vacuum so as to obtain the final product (14.54 g, reddish-brown solid, melting point: 33° C.)
b) Preparation of the Stabilizer (S2): Fe[(Ligand A)$_1$, (Stearate)$_1$, (Octanoate)$_1$]

4.91 g of 50%-pure stearic acid (18.1 mmol), 2.55 g of octanoic acid (17.7 mmol), 6.86 g of "Rhodiastab® 50" (17.8 mmol) and 10.64 g of water are loaded as heel into a 200 ml reactor equipped with a condenser, an anchor stirrer and a temperature probe. The mixture is stirred at ambient temperature and 5.23 g of potassium hydroxide at 49.6% by weight (46.9 mmol) are added. 61.51 g of toluene and, finally, 9.09 g of a solution of iron chloride hexahydrate at 53.32% by weight in water (i.e. 17.9 mmol of iron) are then added. After reaction for 15 minutes, the stirring is stopped and the medium separates by settling out. The phases are separated. The organic phase is washed (deionized water+aqueous solution of potassium hydroxide at 50% by weight) until a neutral pH is obtained. The toluene is then removed by distillation under vacuum so as to obtain 11.9 g of final product (yield=78%).

c) Preparation of the Iron(III) Complex Stabilizers (S3): Fe[(Ligand A)$_1$; (Benzoate)$_1$; Octanoate)$_1$]

2.58 g of benzoic acid (21.1 mmol), 3 g of octanoic acid (21 mmol), 8.26 g of "Rhodiastab® 50" (21.4 mmol) and 29.21 g of water are loaded as heel into a 200 ml reactor equipped with a condenser, an anchor stirrer and a temperature probe. The mixture is stirred at ambient temperature and 9.38 g of potassium hydroxide at 49.8% by weight (83.4 mmol) are added. 42.72 g of toluene and, finally, 10.90 g of a solution of iron chloride hexahydrate at 54.95% by weight in water (i.e. 22.2 mmol of iron) are then added. After reaction for 15 minutes, the stirring is stopped and the medium separates by settling out. The phases are separated. The organic phase is washed with deionized water. The toluene is then removed by distillation under vacuum so as to obtain the final product (14.52 g, yield=97%, melting point=34° C.)

This procedure is repeated with the starting constituents being varied, and the stabilizers (S4) and (S5) were prepared.

Structure of the Fe(III) complexes: Fe[Ligand A, benzoate, octanoate]

| Stabilizers | Molar ratio (mole) | | |
|---|---|---|---|
| | Ligand (A) | benzoate | octanoate |
| (S3) | 1 | 1 | 1 |
| (S4) | 0.110 | 0.110 | 2.780 |
| (S5) | 0.048 | 0.048 | 2.904 |

Example 2

Organopolysiloxane Composition which is Heat-Curable in the Presence of Peroxide The following are intimately mixed with a mixer:

100 parts of a polyorganosiloxane a) which is a poly(dimethyl)(methylvinyl)siloxane blocked at each of its two ends with a trimethylsiloxy unit, containing 720 ppm of vinyl groups in the chain, having a viscosity of 20 million mPa·s at 25° C.;

46 parts of D$_4$ (octamethylcyclotetrasiloxane)—treated fumed silica having a specific surface area of 200 m$^2$/g;

2.4 parts of a polydimethylsiloxane oil blocked at both of its ends with dimethylhydroxysiloxy units, containing 9% by weight of hydroxyl OH, having a viscosity of 50 mPa·s at 25° C., and 1 part of a coupling agent, gamma-methacryloyl-oxypropyltrimethoxysilane.

The base mixture is obtained and is transferred to a roll-type mixer, so as to incorporate, per 100 parts of this mixture above, 1.25 parts of 2,4-dichlorobenzoyl peroxide (at 50%) (CAS No. 133-14-2) and, according to the tests, x parts by weight of a stabilizer (S4) or (S5) per 100 parts of mixture.

The composition is then formed and crosslinked at approximately 115° C. for 8 minutes. The elastomers obtained underwent exposure for 3 days at 250° C. and 7 days at this same temperature. The results are indicated in Table 1 below, in which it can immediately be seen that the HCEs stabilized with the additives according to the invention Tests 1 and 2 are heat resistant and maintain good elastomeric properties.

TABLE 1

| | | Results | | |
|---|---|---|---|---|
| | | Comparative test without the addition of thermal stabilizer | Test 1 Invention | Test 2 Invention |
| | (S5) (x) by wt | 0 | 0.026 | 0 |
| | (S4) (x) by wt | 0 | 0 | 0.026 |
| SAH | Starting | 67 | 67 | 67 |
| IS (%) | properties of | 56 | 55 | 55 |
| TS (MPa) | the elastomer | 11.2 | 10.8 | 11 |
| E/B (%) | (HCE) | 351 | 352 | 347 |
| 100% Modulus (MPa) | | 2.78 | 2.7 | 2.8 |
| SAH | Properties of | brittle | 69 | 68 |
| Impact strength | the elastomer after 3 days at | | 53 | 53 |
| Tensile strength (MPa) | 250° C. | | 6.9 | 7 |
| Elongation at break (%) | | | 245 | 250 |
| 100% Modulus (MPa) | | | 3.23 | 3.2 |
| SAH | Properties of | brittle | 73 | 74 |
| Impact strength | the elastomer after 7 days at | | 58 | 58 |
| Tensile strength (MPa) | 250° C. | | 6.6 | 6.6 |
| Elongation at break (%) | | | 197 | 171 |
| 100% Modulus (MPa) | | | 3.8 | 4.3 |

Abbreviations in Table 1:
SAH: SHORE A hardness (standard DIN 53 505).
IS: Impact strength (standard DIN 53 512; value in %).
TS: Tensile strength (standard NF-46 002, value in M.Pa).
E/B: Elongation at break (standard NF-46 002; value in %).

The invention claimed is:

1. An organopolysiloxane composition crosslinkable into a thermally stable silicone elastomer, which comprises at least one thermal stabilizer (S) which is an iron(III) complex comprising at least one ligand L which is a β-diketonate (A) prepared from a β-diketone selected from the group consisting of stearoylbenzoylmethane, dibenzoylmethane, octanoylbenzoylmethane, 4-t-butyl-4'-methoxydibenzoylmethane, 4,4'-dimethoxydibenzoylmethane, and 4,4'-di-tert-butyldibenzoylmethane.

2. The organopolysiloxane composition as defined by claim 1, in which the thermal stabilizer (S) comprises an iron(III) complex having the formula:

$$Fe[L_x;B_y;C_z]$$

in which:

x, y and z represent the number of moles of each species with:

$0<x\leq3$, $0\leq y\leq(3-x-z)$; $0\leq z\leq(3-x-y)$ and $[x+y+z]=3$, the ligand L is a β-diketonate (A), and the ligands B and C, which may be identical or different, are each an ion constituted of a single atom or a molecular ion.

3. The organopolysiloxane composition as defined by claim 1, in which the thermal stabilizer (S) comprises an iron(III) complex having the formula:

$$Fe[L_x;B_y;C_z]$$

in which:

x, y and z represent the number of moles of each species with:
0<x≤3; 0≤y≤(3−x−z); 0≤z≤(3−x−y) and [x+y+z]=3,
the ligand L is a β-diketonate (A), and
the ligands B and C, which may be identical or different, are molecular ions.

4. The organopolysiloxane composition as defined by claim 2, in which the ligands B and C, which may be identical or different, are each a carboxylate.

5. The organopolysiloxane composition as defined by claim 4, in which the ligands B and C, which may be identical or different, each have the formula:

R⁴COO⁻ in which:
R⁴ is an optionally substituted, $C_1$-$C_{40}$ hydrocarbon-based monovalent organic radical.

6. The organopolysiloxane composition as defined by claim 4, in which the ligands B and C, which may be identical or different, are each an aromatic carboxylate or a $C_1$-$C_{40}$ saturated fatty acid carboxylate.

7. The organopolysiloxane composition as defined by claim 6, in which the ligands B and C are selected from among the anions of the following corresponding acids:
formic acid, acetic acid, propionic acid, butyric acid, caproic acid, caprylic acid, capric acid, lauric acid, myristic acid, palmitic acid, margaric acid, stearic acid, arachidic acid, behenic acid, lignoceric acid, cerotic acid, montanic acid, melissic acid, laceroic acid and benzoic acid.

8. The organopolysiloxane composition as defined by claim 1, in which the β-diketonate (A) is prepared from a stearoylbenzoylmethane β-diketone of formula (II) below:

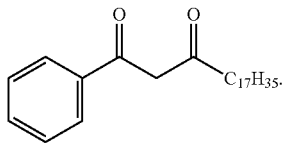

(II)

9. A thermally stable organopolysiloxane elastomer produced by curing and/or crosslinking the organopolysiloxane composition as defined by claim 1.

10. A thermal stabilizer (S) for an organopolysiloxane composition crosslinkable into an elastomer which comprises an iron(III) complex having the formula:

Fe[L$_x$;B$_y$;C$_z$]

in which:
x, y and z represent the number of moles of each species with:
0≤x≤3, 0≤y≤(3−x−z); 0≤z≤(3−x−y) and [x+y+z]=3;
the ligand L is a β-diketonate (A) as defined by claim 1; and
the ligands B and C, which may be identical or different, are each a carboxylate.

11. The thermal stabilizer (S) as defined by claim 10, in which the β-diketonate (A) is prepared from a stearoylbenzoylmethane β-diketone of formula (II) below:

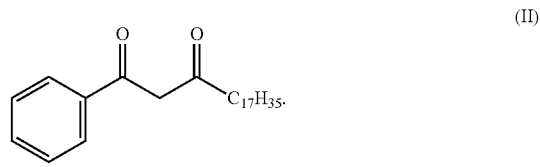

(II)

12. The thermal stabilizer (S) as defined by claim 10, in which
0<x≤3, 0≤y≤(3−x−z); 0≤z≤(3−x−y) and [x+y+z]=3, and
the ligands B and C, which may be identical or different, are each a $C_1$-$C_{40}$ saturated fatty acid carboxylate or an aromatic carboxylate.

13. The thermal stabilizer (S) as defined by claim 10, in which:
x=3, y=0 and z=0, and
the ligand L is a β-diketonate prepared from a stearoylbenzoylmethane β-diketone of formula (II) below:

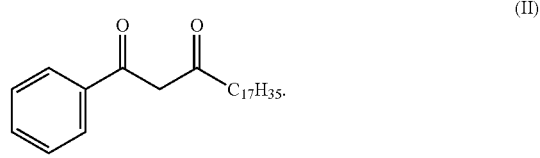

(II)

14. A thermal stabilizer (S) as defined by claim 10 formulated into an organopolysiloxane composition which crosslinks into elastomeric state.

15. A method for thermally stabilizing a silicone elastomer, comprising including a thermal stabilizer (S) as defined by claim 9 into an organopolysiloxane composition and then crosslinking same into an elastomeric state.

* * * * *